US009648556B2

(12) United States Patent
Odio Vivi et al.

(10) Patent No.: US 9,648,556 B2
(45) Date of Patent: May 9, 2017

(54) COORDINATION OF CHANNEL SCANNING AMONG MULTIPLE RADIOS

(71) Applicant: HEWLETT PACKARD ENTERPRISE DEVELOPMENT LP, Houston, TX (US)

(72) Inventors: Andres Jose Odio Vivi, San Jose (CR); Allan Delgado Campos, San Jose (CR); Francisco Jose Rojas Fonseca, San Jose (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/032,780

(22) PCT Filed: Nov. 8, 2013

(86) PCT No.: PCT/US2013/069202
§ 371 (c)(1),
(2) Date: Apr. 28, 2016

(87) PCT Pub. No.: WO2015/069277
PCT Pub. Date: May 14, 2015

(65) Prior Publication Data
US 2016/0278002 A1    Sep. 22, 2016

(51) Int. Cl.
*H04W 4/00*    (2009.01)
*H04W 48/16*    (2009.01)
(Continued)

(52) U.S. Cl.
CPC ....... *H04W 48/16* (2013.01); *H04W 72/0453* (2013.01); *H04W 76/064* (2013.01)

(58) Field of Classification Search
CPC ............. H04W 48/16; H04W 72/0453; H04W 76/064; H04W 4/00; H04W 4/06;
(Continued)

(56) References Cited

U.S. PATENT DOCUMENTS 6,807,163 B1 * 10/2004 Shi ........................ H04W 88/02
370/337
7,359,676 B2 * 4/2008 Hrastar ............... H04L 63/1441
370/250
(Continued)

FOREIGN PATENT DOCUMENTS

KR    10-2008-0110231 A    12/2008
KR    10-2013-0031184 A    3/2013
WO    WO-2012/030239 A1    3/2012

OTHER PUBLICATIONS

International Search Report and Written Opinion, International Application No. PCT/US2013/069202, Date: Jul. 31, 2007, pp. 1-8.
(Continued)

*Primary Examiner* — Mahendra Patel
(74) *Attorney, Agent, or Firm* — Hewlett Packard Enterprise Patent Department (57) ABSTRACT

Examples herein disclose preventing multiple radios from simultaneously scanning a same channel. The examples identify a first scan time associated with the multiple radios and determine a second scan time based on the first scan time. The examples prevent the multiple radios from simultaneously scanning the same channel through a coordination of channel scanning of each of the multiple radios based on the second scan time.

15 Claims, 5 Drawing Sheets

(51) Int. Cl.
*H04W 72/04* (2009.01)
*H04W 76/06* (2009.01)

(58) Field of Classification Search
CPC ..... H04W 76/02; H04W 80/00; H04W 12/04; H04W 12/08; H04W 88/08; H04L 12/28; H04N 21/41407; H04N 21/4345; H04N 21/4349
USPC ............ 455/434, 450, 452.1, 432.3; 370/338
See application file for complete search history.

(56) References Cited

U.S. PATENT DOCUMENTS

| | | | |
|---|---|---|---|
| 7,738,863 | B2 | 6/2010 | Saarikivi et al. |
| 8,041,319 | B2 | 10/2011 | He et al. |
| 8,175,005 | B2 | 5/2012 | Okmyanskiy et al. |
| 2005/0128988 | A1* | 6/2005 | Simpson ............... H04W 48/16 370/338 |
| 2005/0245269 | A1* | 11/2005 | Demirhan ............. H04W 24/00 455/452.1 |
| 2006/0132302 | A1* | 6/2006 | Stilp ........................ G05B 9/03 340/539.22 |
| 2006/0142004 | A1* | 6/2006 | He ........................ H04W 48/16 455/434 |
| 2009/0075650 | A1* | 3/2009 | Jung ..................... H04W 48/16 455/432.3 |
| 2009/0323609 | A1* | 12/2009 | Walton .................. H04W 48/16 370/329 |
| 2012/0077491 | A1* | 3/2012 | Namm .................. H04W 84/08 455/434 |

OTHER PUBLICATIONS

Jayakrishnan Unnikrishnan and Venugopal V. Veeravalli, "Cooperative Sensing for Primary Detection in Cognitive Radio," IEEE Journal of Selected Topics in Signal Processing, Feb. 2008, pp. 18-27, vol. 2, No. 1, IEEE.

* cited by examiner

202 Channel = {1, 2, 3}
Radios = {A, B, C}

| | t0 | t1 | t2 | t3 | t4 | t5 | t6 | t7 | t8 | t9 | t10 | t11 | t12 | t13 | t14 | t15 | t16 | t17 | t18 | t19 | t20 | t21 | t22 | t23 |
|---|---|---|---|---|---|---|---|---|---|---|---|---|---|---|---|---|---|---|---|---|---|---|---|---|
| Radio A | 1 |   | 1 |   |   |   |   |   |   |   | 2 |   | 2 |   |   |   |   |   |   |   |   | 3 |   | 3 |
| Radio B |   | 1 |   |   |   |   |   |   |   |   | 2 | 2 |   |   |   |   |   |   |   |   | 3 | 3 |   |   |
| Radio C | 1 |   |   |   |   |   |   |   |   | 2 | 2 |   |   |   |   |   |   |   |   | 3 | 3 |   |   |   |

206

| Radio | t0 | t1 | t2 | t3 | t4 | t5 | t6 | t7 | t8 | t9 | t10 | t11 | t12 | t13 | t14 | t15 | t16 | t17 | t18 | t19 | t20 | t21 | t22 | t23 |
|---|---|---|---|---|---|---|---|---|---|---|---|---|---|---|---|---|---|---|---|---|---|---|---|---|
| | A |   | B | B | B |   | C | C |   |   | A | A | B | B | B |   | C | C |   |   | A | A | A |   |

204

| | t0 | t1 | t2 | t3 | t4 | t5 | t6 | t7 | t8 | t9 | t10 | t11 | t12 | t13 | t14 | t15 | t16 | t17 | t18 | t19 | t20 | t21 | t22 | t23 |
|---|---|---|---|---|---|---|---|---|---|---|---|---|---|---|---|---|---|---|---|---|---|---|---|---|
| Radio A | 3 |   |   |   |   |   |   |   |   |   | 2 |   |   |   |   |   |   |   |   |   |   |   |   |   |
| Radio B |   |   |   | 1 | 1 |   |   |   |   |   |   | 3 |   |   |   |   |   |   | 3 |   | 3 |   | 2 | 2 |
| Radio C |   |   |   |   |   |   | 2 |   |   |   |   |   |   |   |   |   | 1 | 1 |   |   |   |   |   |   |

Increase Detection Capability among Radios
Average Unscanned Interval of Uncoordinated Radios (First Scan Time) = 6
Average Unscanned Interval of Coordinated Radios (Second Scan Time) = 1.33

Service Availability on Each Radio
Average Radio Availability Interval of Uncoordinated Radios (First Scan Time) = 8
Average Radio Availability of Coordinated Radios (Second Scan Time) = 7

Initial Scan Offset for Each Radio
Offset for Radio A = 0
Offset for Radio B = 3
Offset for Radio C = 7

COORDINATION OF CHANNEL SCANNING AMONG MULTIPLE RADIOS

BACKGROUND

Radios and networking devices, such as access points, may communicate using radio frequency (RF) signals. The radios may scan at a specified frequency, also referred to as a channel, for communication signals.

BRIEF DESCRIPTION OF THE DRAWINGS

In the accompanying drawings, like numerals refer to like components or blocks. The following detailed description references the drawings, wherein.

DETAILED DESCRIPTION

Multiple radios within a networking system may simultaneously scan a same channel for data signals. This may lead to wasted resources as multiple radios within close proximity to one another may be scanning the same channel. Additionally, simultaneously scanning the same channel may be inefficient which may lead to a lag time in responding to anomalies. For example, one of the multiple radios may scan the same channel for the data signal indicating the anomaly and may not respond to that anomaly until the next scan of that channel. Further, uncoordinated channel scanning among the multiple radios may interrupt service to clients.

To address these issues, examples disclosed herein coordinate multiple radios to prevent the multiple radios from simultaneously scanning a same channel. Scanning a channel includes the multiple radios detecting or monitoring at various frequencies for data signals. The examples disclosed identify a first scan time associated with the multiple radios and adjusts the first scan time to obtain the second scan time. In this manner, the second scan time is based upon the first scan time. The examples may distribute the second scan time to the multiple radios for coordinating the channel scanning of the multiple radios. Coordinating the channel scanning of the multiple radios increases the efficiency of the networking system as it prevents the multiple radios from simultaneously scanning the same channel. Additionally, preventing the multiple radios from simultaneously scanning the same channel saves system resources as the multiple radios may not overlap detecting data signals over the same channel. Further, coordinating the multiple radios for channel scanning enables the multiple radios to respond in a coordinated response to a detected anomaly.

In another example discussed herein, the adjustment of the first scan time to obtain the second scan time may include decreasing an average non-scanning time interval of the multiple radios to obtain the second scan time. The non-scanning time interval is the time interval in which the networking system is not being scanned by the multiple radios. Decreasing the average non-scanning time interval increases detection capability among the multiple radios as the multiple radios increase the average time spent scanning channels.

In a further example discussed herein, the first scan time may include an average service availability time interval. In this example, the adjustment of the first scan time to obtain the second scan time may include increasing the average service availability. Increasing the average service availability among the multiple radios, decreases service interruptions to clients as each of the multiple radios scan channels in less time.

In summary, examples disclosed herein coordinate multiple radios to prevent the multiple radios for simultaneously scanning the same channel.

Figure 1:
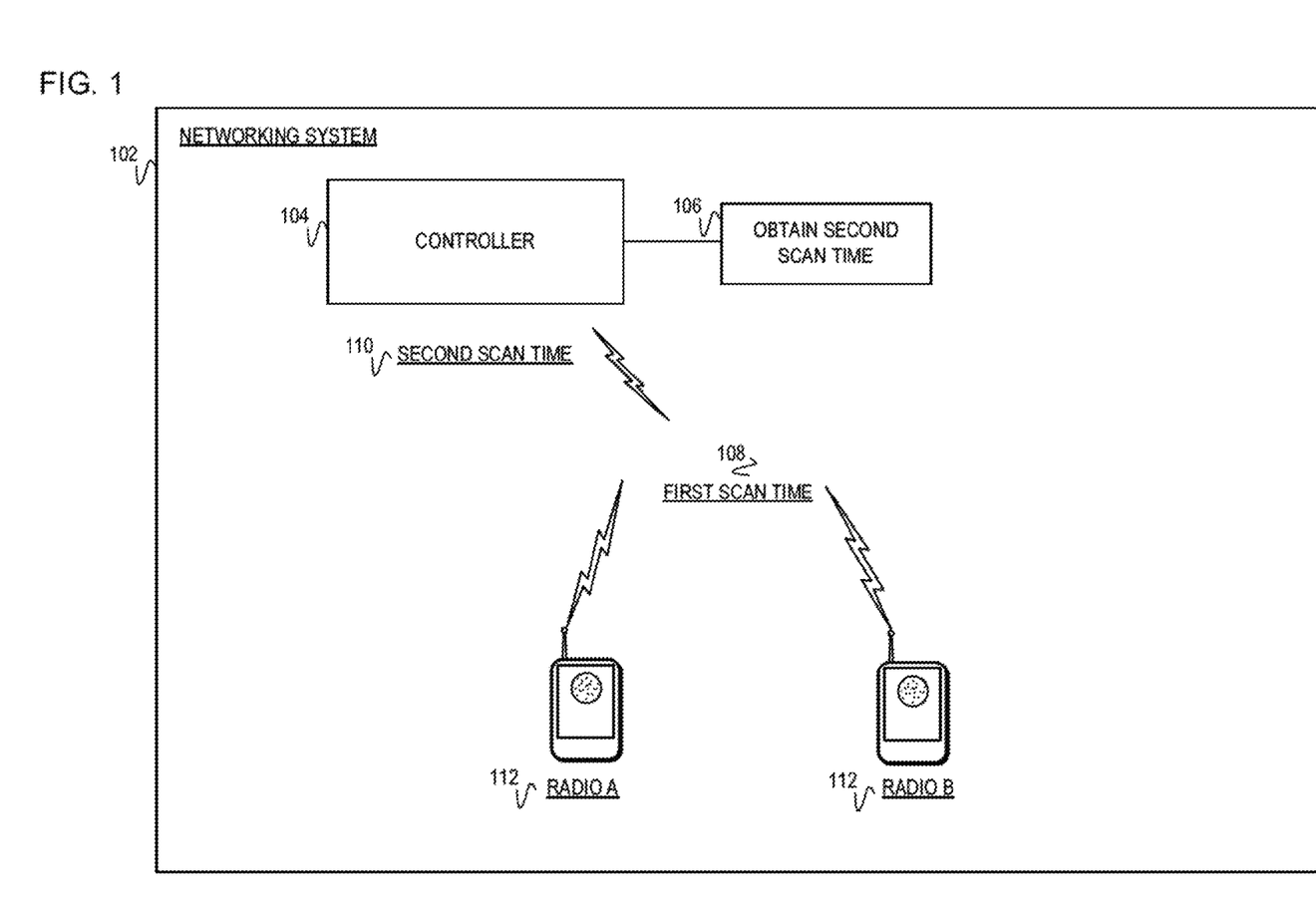
FIG. 1 is a block diagram of an example networking system including a controller to identify a first scan time among multiple radios and determine a second scan time for coordinating the multiple radios, the coordination of the multiple radios prevents the multiple radios from simultaneously scanning a same channel.

Referring now to the figures, FIG. 1 is a block diagram of an example networking system 102 including a controller 104 to identify a first scan time 108 associated with multiple radios 112. The first scan time 108 may determined by the controller 104 detecting signals from each of the multiple radios 112, tracking configurations of each of the multiple radios 112, and/or pre-defined by an administrator. Upon identifying the first scan time 108, the controller 104 obtains a second scan time 110 at module 106 to coordinate the multiple radios 112. The coordination of the multiple radios 112 prevents the multiple radios 112 from simultaneously scanning a same channel. A channel refers to a particular capacity for transmitting and receiving data signals over this particular capacity. Such examples may include bandwidth, data width, particular frequency, etc. As such, the channel is used to convey the data signal from a transmitter(s) to a receiver(s). The first scan time 108 is associated with the multiple radios 112 prior to coordination. In this manner, the first scan time 108 may be associated with the multiple radios 112 to represent a time interval the multiple radios 112 may or may not be scanning channels. The second scan time 110 is an adjustment of the first scan time 108 which coordinates the multiple radios 112 in such a manner that prevents the multiple radios from simultaneously scanning the same channel. The networking system 102 includes the controller 104 and multiple radios 112 to transmit and receive data signals on various channels (e.g., particular frequency bandwidths). The networking system 102 may include a wired and/or a wireless communication system in which the multiple radios 112 and/or an access point may transmit and receive the data signals. As such, the wireless network may include additional multiple radios 112 (not illustrated) and/or additional networking devices (not illustrated). Implementations of the networking system 102 include a wide area network (WAN), local area network (LAN), personal area network (PAN), mesh network, mobile device network, or other type of networking system capable of including the controller 104 and/or multiple radios 112 for coordinating channel scanning of the multiple radios 112. Further, although FIG. 1 illustrates the networking system 102 as including the controller 104 and multiple radios 112, implementations should not be limited as this was done for illustration purposes. For example, the networking system 102 may illustrate the controller 104 as an access point and as such, may include other networking components and/or devices.

The controller 104 is an electrical device which coordinates the channel scanning among the multiple radios 112. The controller 104 identifies the first scan time 108 and in turn, uses the first scan time 108 to obtain the second scan time at module 106 for coordinating the channel scanning among the multiple radios 112. As such, implementations of the controller 104 include a hardware component, microchip, chipset, electronic circuit, processor, microprocessor, semiconductor, microcontroller, central processing unit (CPU), or other programmable device capable of coordinating the multiple radios 112. In one implementation, the controller 104 is part of networking device, such as an access point, and may include one of the multiple radios 112.

At module 106 the controller 104, upon identifying the first scan time 108, obtains the second scan time 110 for distribution to the multiple radios 112 for coordination. The module 106 may include an instruction, set of instructions, process, operation, logic, technique, function, firmware, and/or software executable by the controller 104 to obtain the second scan time 110 from the first scan time 108. As such, the module 106 may be part of the controller 104 and/or a networking device which includes the controller 104. In one implementation, the controller 104 may adjust the first scan time 108 to determine the second scan time 110. In another implementation, the controller 104 may increase an average interval time of the multiple radios to obtain the second scan time 110. For example, the controller 104 may increase an average service availability time interval among one of the multiple radios (time interval between an end of a channel scan and beginning of the next channel scan) to obtain the second scan time 110. In this example, increasing the service availability time interval among the multiple radios 112 enables the multiple radios 112 to minimize service disruptions. In another example, the controller 104 may decrease an average of unscanned interval of the multiple radios 112 (time interval when the multiple radios are not scanning channels). In this example, decreasing the average unscanned interval to obtain the second scan time 110, enables the multiple radios 112 to increase detection capabilities as the multiple radios 112 may spend a longer time interval scanning the channels for anomalies and/or data signals.

The first scan time 108 is associated with the multiple radios 112 as a representation of the time interval in which the multiple radios may spend scanning or not scanning channels, accordingly. As such, the second scan time 110 is an adjustment of the first scan time 108 to coordinate the multiple radios 112, thus preventing the multiple radios 112 from simultaneously scanning the same channel. Implementations of the first scan time 108 include any one or combination of the following examples: the average radio scan time of one of the multiple radios 112 (time interval one of the multiple radios 112 may spend consecutively scanning at least one channel); the average radio scan interval of one of the multiple radios 112 (time interval between the start of consecutive scans by one of the multiple radios); the average radio service availability interval of one of the multiple radios 112 (time interval between the end of a channel scan and the start of the next channel scan for one of the multiple radios 112); the average area scan interval by the multiple radios 112 (time interval between the start of consecutive scans in the networking system 102 area by the multiple radios 112); and/or the average unscanned interval among the multiple radios 112 within the networking system 102 (time interval when the networking system 102 is not scanned by the multiple radios 112). As such, to determine the second scan time 110, the controller 104 may increase and/or decrease at least one of the above-referenced examples of the first scan time 108 to obtain the second scan time 110. These implementations may be described in detail in the next figure.

The second scan time 110 is the adjustment of the first scan time 108 in such a manner to coordinate the multiple radios 112 which prevents the multiple radios 112 from scanning the same channel. In implementations, the adjustment of the first scan time 108 may include increasing or decreasing the first scan time 108 to obtain the second scan time 110. Adjusting the first scan time 108 to obtain the second scan time 110, the controller 104 coordinates the multiple radios 112 to increase detection capability among the multiple radios 112 and/or minimize service disruptions to clients by using one of the multiple radios 112 for communication. In another implementation, the second scan time 110 may include a different time interval for each of the multiple radios 112. In this implementation, the second scan time 110 may be tailored at the controller 104 for each of the multiple radios 112. Such tailoring may include a time offset to delay an initialization of scanning a particular channel at each of the multiple radios 112.

The multiple radios 112 are devices that scan various channels for data. As such, each of the multiple radios 112 may include an antenna component, receiving component, and/or transmitting component to receive and/or transmit the data signals over the various channels. The multiple radios 112 may scan and/or not scan the various channels according to the first scan time 108. The first scan time 108 represents the uncoordinated time intervals of channel scanning among the multiple radios 112. The efficiency of the networking system 102 may increase by coordinating the multiple radios 112 based on the second scan time 110. The second scan time 110 may be distributed to the multiple radios 112 for preventing the multiple radios 112 from simultaneously scanning the same channel. In this implementation, the coordination of the multiple radios 112 prevents the multiple radios 112 from scanning the same frequency at the same time. In one implementation, the multiple radios 112 may be part of the networking device along with the controller 104. In another implementation, various weighting mechanisms may be used to prioritize scanning times and/or a number of channels for each of the multiple radios 112 to scan. The weighting mechanism may be assigned based on how close each of the radios are to the common sensing area. For example, Radio A may be located closer to the controller 104 and as such, may include a greater weighting mechanism so Radio A may scan more channels than Radio B.

Figure 2:
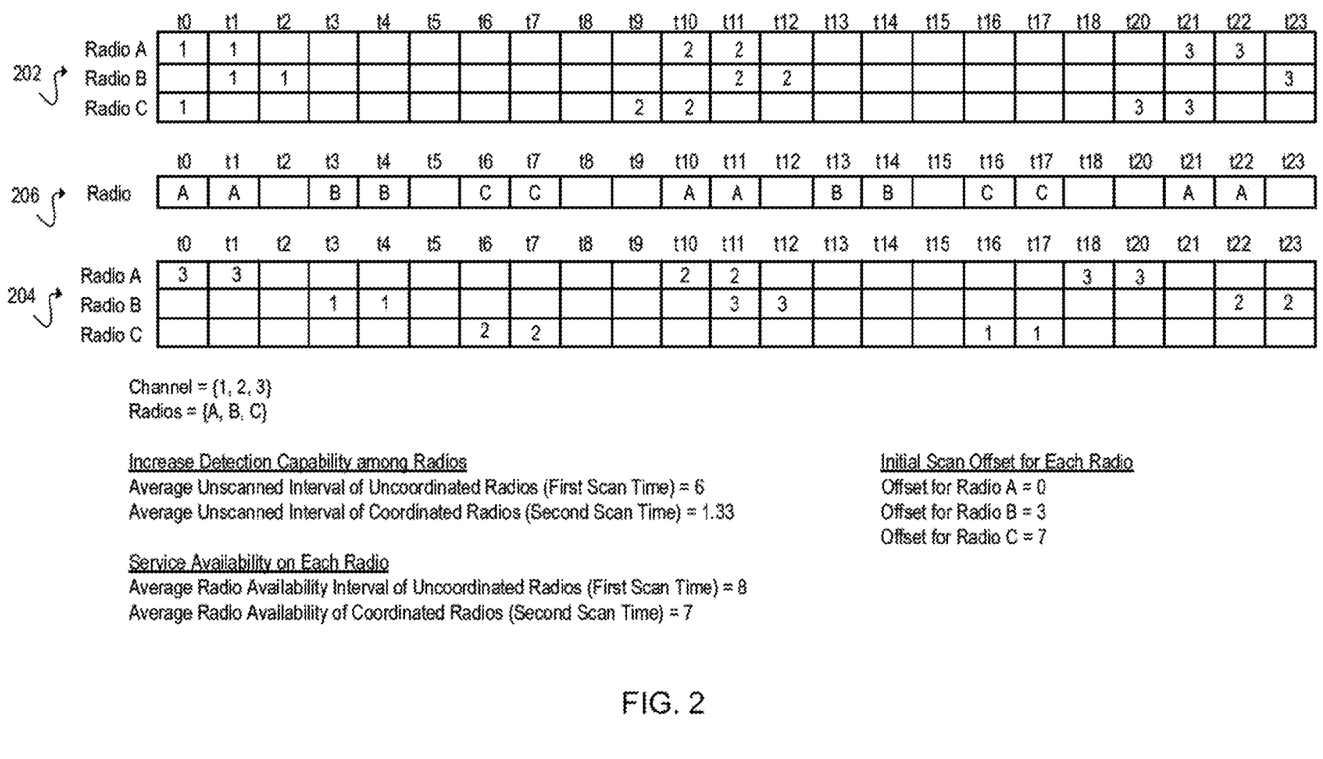
FIG. 2 is a data diagram of example scan time intervals among multiple radios for coordination within a networking system.

FIG. 2 is a data diagram of example scan time intervals among multiple radios (Radio A, Radio B, and Radio C) in various states of coordination 202 and 204 within a networking system. The various states of coordination may include an uncoordinated state (state prior to coordination) 202 and a coordinated state (state after coordination) 204. The time intervals (t0-t23) are illustrated near the top of each state of coordination 202 and 204. Within each of the states of coordination 202 and/or 204, the channels (1, 2, and 3) are listed by numerals within the various boxes to represent which radio may be scanning which channel at a given time interval.

In the uncoordinated state 202, the multiple radios (Radio A, Radio B, and Radio C) may simultaneously scan a same channel. For example, at time (t0) the radios (Radio A and Radio C) are simultaneously scanning the same channel (1) while at time (t1) the radios (Radio A and Radio B) are simultaneously scanning the same channel (1). In another example, at time (t10), the radios (Radio A and Radio C) are simultaneously scanning the same channel (2), while at time (t11) the radios (Radio A and Radio B) are simultaneously scanning the same channel (2). The uncoordinated state 202 represents various first scan times in which the multiple radios may be scanning the same channel. As discussed above in connection with FIG. 1, implementations of the various first scan times may include one or combination of the following: an average radio scan time which is the time interval each of the multiple radios may spend consecutively scanning at least one channel (Radio A=2; Radio B=2; Radio C=2); an average radio scan interval of each of the multiple radios, which is the time interval between the start of consecutive scans (Radio A=10; Radio B=10; and Radio C=10); an average radio service availability time interval, which is the time interval for each of the multiple radios between the end of a channel scan and the start of the next channel scan (Radio A=8; Radio B=8; and Radio C=8); an average non-scanning time interval among the multiple radios, which is the time interval when the networking system is not being scanned by the multiple radios (average unscanned interval of uncoordinated radios=6). The controller in the networking system identifies one of the first scan times and adjusts the first scan time to obtain the second scan time. The second scan time is distributed to the multiple radios for coordination, thus preventing the simultaneously scanning of the same channel in the coordinated state 204.

In one implementation, to reach the coordinated state 204 there may be an additional intermediate state 206 which illustrates which radio should be scanning at which time interval. For example, Radio A should scan one of the various channels from t0-t1, t10-t11, and t21-t22. Radio B should scan one of the various channels from t3-t4 and t13-t14. Radio C should scan one of the various channels from t6-t7 and t16-t17.

In the coordinated state 204, the controller obtains the second scan time and distributes the second scan time the multiple radios to prevent each of the multiple radios from simultaneously scanning at a given interval, the same channel. For example, Radio A scans channel 3 at time t0-t1 while Radio B scans channel 1 at time t3-t4 and Radio C scans channel 2 from t6-t7. In another example, Radio A scans channel 2 from t10-t11 and Radio B scans channel 3 from t11-t12. The coordinated state 204 represents the various second scan time intervals that may be obtained to coordinate the radios, thus preventing the simultaneous scanning of the same channel as in the uncoordinated state 202.

In one implementation, the second scan time may be obtained by decreasing the average unscanned interval of uncoordinated radios in the uncoordinated state 202. For example as listed below the coordinated state 204, the first scan time (average unscanned interval of uncoordinated radios=6) may be decreased to obtain the second scan time (average unscanned interval of coordinated radios=1.33). Decreasing the average unscanned interval among the multiple radios, enables an increased detection capability among the multiple radios as the radios may be scanning channels for longer time intervals. Additionally in this implementation, the average radio availability may also maintain and/or slightly decrease. For example, the first scan time (average radio availability interval of uncoordinated radios=8) may be decreased to obtain the second scan time (the average radio availability of coordinated radios=7).

In a further implementation, the second scan time may additionally include an offset for each of the radios. For example, in the list below the coordinated state 204, the offset for Radio A (0), the offset for Radio B (3), and the offset for Radio C (7).

Figure 3:
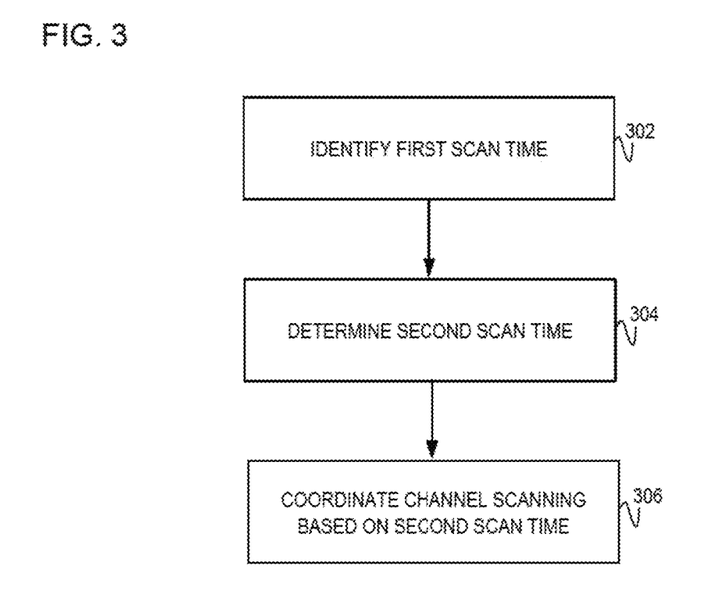
FIG. 3 is a flowchart of an example method to identify a first scan time among multiple radios for determining a second scan time, the method may coordinate the multiple radios based on the second scan time to prevent the multiple radios from simultaneously scanning a same channel.

FIG. 3 is a flowchart of an example method to coordinate multiple radios within a networking system to prevent the multiple radios from simultaneously scanning a same channel. The method identifies a first scan time among the multiple radios and determines a second scan time based on the identified first scan time. The method may proceed to coordinate channel scanning of each of the multiple radios based on the determined second scan time. The first scan time is an interval of time in which one radio within the multiple radios and/or the multiple radios may scan or not scan a channel. As such, the second scan time is an adjustment of the first scan time to coordinate the multiple radios, thus preventing the multiple radios from simultaneously scanning the same channel. Coordinating the multiple radios to prevent the simultaneously scanning of the same channel ensures the networking system scans channels in an efficient manner. The efficient manner prevents the multiple radios from scanning the same channel simultaneously as this may lead to wasted resources. Additionally, the coordination of the multiple radios minimizes service disruptions as preventing the simultaneously scanning of the same channel, the multiple radios may be more readily available to service clients. In discussing FIG. 3, references may be made to the components in FIGS. 1-2 to provide contextual examples. In one implementation, a networking device, such as wireless access point in a networking system 102 as in FIG. 1 executes operations 302-306 to coordinate the multiple radios. In another implementation of FIG. 3, a controller 104 associated with a networking system 102 as in FIG. 1 executes operations 302-306. Further, although FIG. 3 is described as implemented by the networking device associated with the networking system 102 as in FIG. 1, it may be executed on other suitable components. For example, FIG. 3 may be implemented in the form of executable instructions on a machine-readable storage medium 504 as in FIG. 5.

At operation 302, the networking device identifies the first scan time among the multiple radios. The first scan time identifies a window of time or an interval in which the multiple radios in an uncoordinated state may be scanning channels. The first scan time may include an average radio scan time among the multiple radios prior to coordination of the multiple radios such as at operation 306. The second scan time is used coordinate the multiple radios, thus preventing overlapping in scanning channels. In implementations, the first scan time may include an average time interval for a particular radio among the multiple radios and/or it may include an average time interval of the multiple radios. In these implementations, the first scan time may include at least one of the following: average radio scan time of at least one radio, which is a time interval a particular radio among the multiple radios may spend consecutively scanning at least one channel; an average radio scan time of at least one radio, which is a time interval between initialization of consecutive scan times by the particular radio among the multiple radios; average radio availability time of at least one radio, which is a time interval between the end of a channel scan and a start of a next channel scan for the particular radio among the multiple radios, specifically the radio availability time includes a non-scanning time interval for that particular radio among the multiple radios; an average scan time interval between the multiple radios, which is a time interval between the start of consecutive scans among the multiple radios; and an average unscanned interval of the multiple radios, which includes a non-scanning time interval of the multiple radios. In another implementation, the networking device may track each configuration of each of the multiple radios and may identify the first scan time. In another implementation, the networking device may detect the multiple radios through signals to determine which radios are located within an area respective to themselves. Using these signals, the networking device may identify the first scan time among the multiple radios in a common area. This implementation is described in detail in the next figure.

At operation 304, the networking device determines the second scan time based on the first scan time identified at operation 302. The second scan time is an adjustment of the first scan time and as such is determined by identifying the first scan time as at operation 302. The second scan time at operation 304 is the time interval in which to coordinate each of the multiple radios to prevent overlap of the same channel scanning. In one implementation, the networking device may determine a threshold based upon a number of the multiple radios within the networking system. The networking device may increase or decrease the first scan time based on the threshold. In other implementations, the second scan time may include increasing or decreasing the first scan time. In this implementation, the second scan time may include increasing the average radio availability interval, this means the time interval between the end of the channel scan and the start of the next channel scan for each radio among the multiple radios increase, thus also increasing the availability of each of the multiple radios to handle client requests. Additionally in these implementations, the second scan time may include decreasing the average unscanned interval of the multiple radios, while maintaining the service availability among the multiple radios. Decreasing the average unscanned (non-scanned) interval increases the detection capability of the multiple radios to scan channels for signals. In a further implementation of operation 304, upon determining the second scan time, the networking device may provide additional considerations into account, such as a assigning a different scanning weight to particular radios, such as radios that may be located closer to the networking device. In this implementation, the networking device may coordinate these particular radios prior to coordinating the other multiple radios.

At operation 306, the networking device coordinates channel scanning among the multiple radios based on the second scan time determined at operation 304. The networking device coordinates the channel scanning of the multiple radios to prevent the multiple radios from simultaneously scanning the same channel. Coordinating the multiple radios, may optimize a set of radios within a common sensing area. This prevents more than one radio in the common area from scanning the same channel simultaneously. Additionally, coordinating the multiple radios prevents an overlap of scanning the same channel. In one implementation of operation 306, the networking device may distribute the second scan time to each of the multiple radios. In another implementation of operation 306, the second scan time may also include an offset time in which each of the multiple radios may initialize channel scanning. In this implementation, the offset time may be a different offset time for each of the multiple radios, thus preventing the simultaneously scanning of the same channel. In another implementation of operation 306, each of the multiple radios are coordinated to scan channels in a same frequency band. For example, the frequency band may include 5-10 MHz, thus the channels are specific frequencies within this frequency band.

Figure 4:
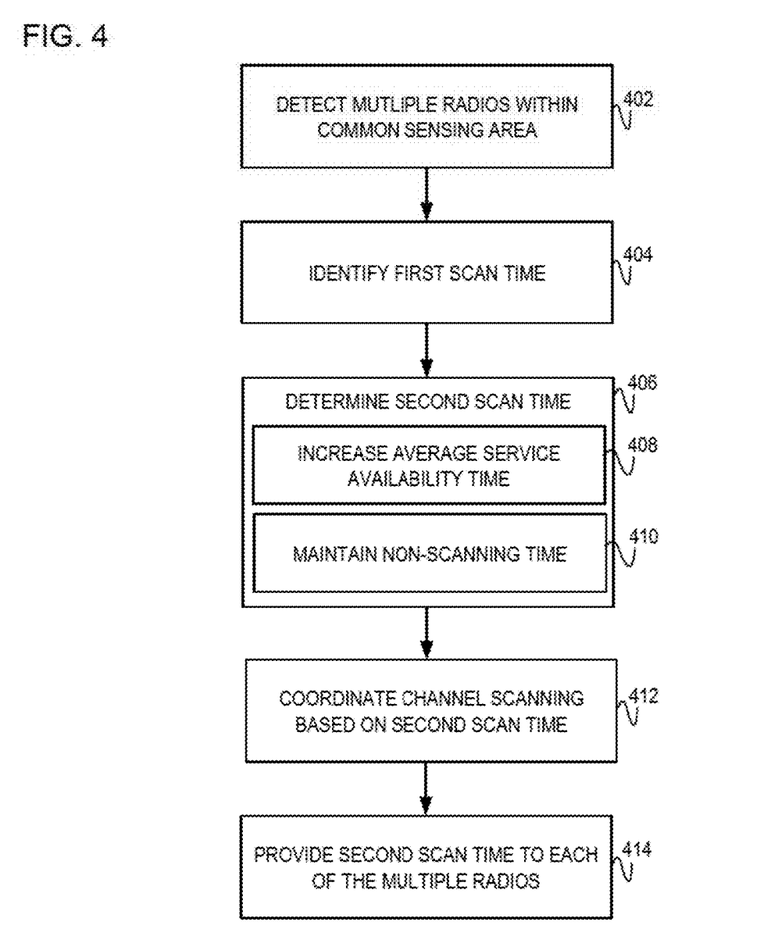
FIG. 4 is a flowchart of an example method to detect multiple radios within a common sensing area for identification of a first scan time, the method determines a second scan time for coordinating multiple radios within a networking system by providing the second scan time to each of the multiple radios.

FIG. 4 is a flowchart of an example method to coordinate channel scanning of multiple radios within a common sensing area. The method detects the multiple radios within the common sensing area for an identification of a first scan time associated with the multiple radios. Upon identifying the first scan, the method determines a second scan time based on the first scan time to coordinate the multiple radios within a networking system. The second scan time may include an increase an average service availability time (time interval between an end of a channel scan and a start of a next channel scan), and/or also maintaining a time interval of non-scanning channels (time interval when the common sensing area is not scanned by the multiple radios). The method determines the second scan time for coordinating the multiple radios within the networking system by providing the second scan time to each of the multiple radios Detecting each of the multiple radios within the common sensing area takes into account scanning devices (e.g., multiple radios) within an area to efficiently coordinate channel scanning within the common sensing area. Efficiently coordinating the channel scanning among the multiple radios within the common sensing area, enables the multiple radios to quickly detect an attack within the channel for follow-up rather than randomly and/or simultaneously scanning the same channel. In discussing FIG. 4, references may be made to the components in FIGS. 1-2 to provide contextual examples. In one implementation, a networking device, such as wireless access point in a networking system 102 as in FIG. 1 executes operations 402-414 to coordinate the multiple radios. In another implementation of FIG. 4, a controller 104 associated with a networking system 102 as in FIG. 1 executes operations 402-414. Further, although FIG. 4 is described as implemented by the networking device associated with the networking system 102 as in FIG. 1, it may be executed on other suitable components. For example, FIG. 4 may be implemented in the form of executable instructions on a machine-readable storage medium 504 as in FIG. 5.

At operation 402, the networking device detects the multiple radios within the common sensing area. The common sensing area is an area within the networking system in which the multiple radios may scan channels, accordingly. In one implementation, the common sensing area may be pre-defined. In this implementation, the networking device may estimate a position or location of each of the multiple radios and may determine the distance between each of the multiple radios. In other implementations, the common sensing area may be obtained by various means, including manual user configuration, site survey, location data through global positioning system (GPS), triangulation, detecting each of the multiple radios, statistical analysis of detected entities, etc. The multiple radios are detected at operation 402 so channel scanning is coordinated with that of their common sensing area neighbors, thus preventing at least two of the multiple radios from scanning the same channel simultaneously. In another implementation, the networking device may detect the multiple radios by signals sent to and from each of the multiple radios. In a further implementation, the networking device may track locations of each of the multiple radios within the common sensing area. In this implementation, the networking device may track the various configurations of each of the multiple radios to identify the first scan time as at operation 404.

At operation 404, the networking device identifies the first scan time associated with the multiple radios. As discussed above with FIG. 3, the first scan time may include an average time of the multiple radios or may include an average time from one of the multiple radios. Implementations may include one or combination of these examples of the first time scan: an average radio scan time of one of the multiple radios (time interval one of the multiple radios may spend consecutively scanning at least one channel); an average radio scan interval of one of the multiple radios (time interval between the start of consecutive scans by one of the multiple radios); an average radio service availability interval of one of the multiple radios (time interval between an end of a channel scan and a start of the next channel scan for one of the multiple radios); an average area scan interval by the multiple radios (time interval between the start of consecutive scans in the common sensing area by the multiple radios); and/or an average unscanned interval among the multiple radios within the common sensing area (time interval when the common sensing area is not scanned by the multiple radios). As such, to determine the second scan time as at operation 406, the networking device may increase and/or decrease these implementations of the first scan time to obtain the second scan time as at operation 406. Operation 404 may be similar in functionality to operation 302 as in FIG. 3.

At operation 406, upon identifying the first scan time at operation 404, the networking device may determine the second scan time. The second scan time is an adjustment of the first scan time to coordinate the multiple radios. As such, the adjustment of the first scan time may include increasing or decreasing the first scan time to obtain the second scan time. In one implementation, the adjustment of the first scan time to obtain the second scan time 406 includes increasing the average service availability time among the one or multiple radios (time interval between the end of the channel scan and the beginning of the next channel scan) as at operation 408. In another further implementation of operation 406-408, the network device may maintain the non-scanning time (time interval when the common sensing area is not scanned by the multiple radios) as at operation 410. Operation 406 may be similar in functionality to operation 304 as in FIG. 3.

At operation 408, the networking device may obtain the second scan time by increasing the average service availability time in one of the multiple radios. The average service availability is the time interval in one of the multiple radios between the end of the channel scan and the start of the next channel scan.

At operation 410, the networking device may obtain the second scan time by maintaining the non-scanning time interval among the multiple radios. The non-scanning time interval is the time interval when the multiple radios within the common sensing area are not channel scanning. Maintaining the non-scanning interval among the multiple radios while also increasing the average service availability at operations 408-410 minimizes service disruptions to clients who may use the multiple radios to transmit communications over particular frequencies (channels).

At operation 412, the networking device coordinates the multiple radios within the common sensing area based on the second scan time determined at operation 406. Operation 412 may be similar in functionality to operation 306 as in FIG. 3.

At operation 414, the networking device provides the second scan time to each of the multiple radios for coordination to prevent the simultaneous scanning of the same channel. In one implementation of operation 414, the networking device may transmit the second scan time to each of the multiple radios with an offset time in which each of the multiple radios are to initialize the channel scanning. Distributing the second scan time to the multiple radios enables the multiple radios to coordinate an initialization of scanning the same channel. Additionally, the networking device may also provide to each of the multiple radios, a sequence of which channels to scan.

Figure 5:
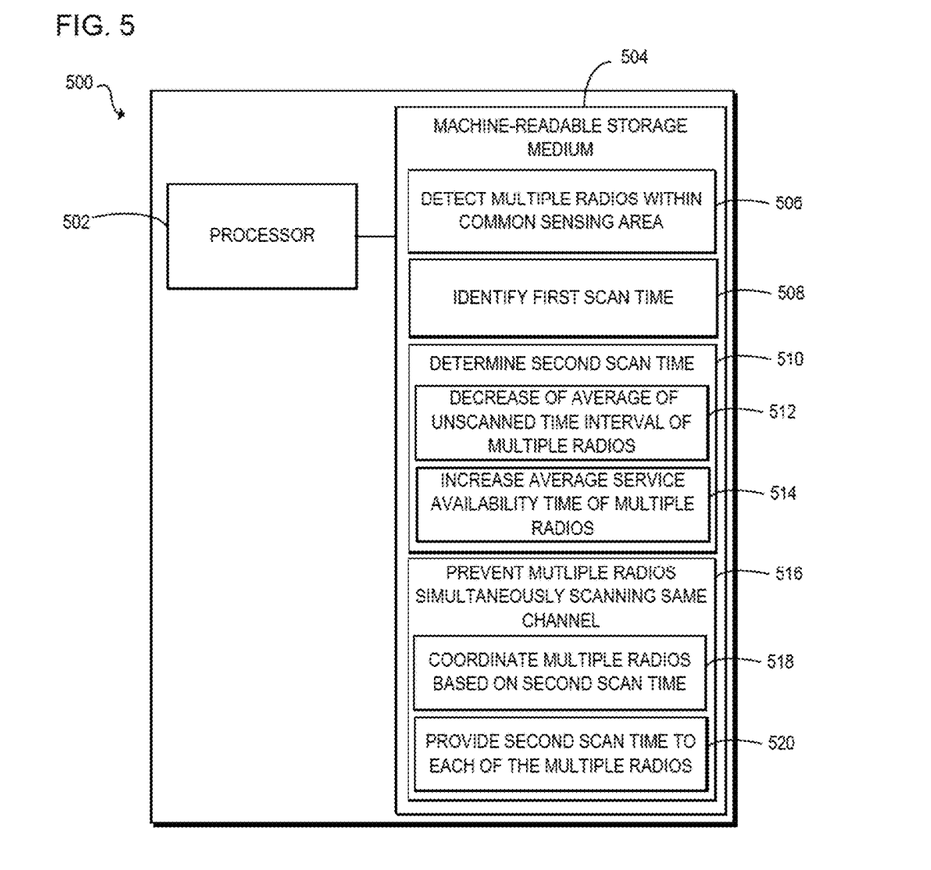
FIG. 5 is a block diagram of an example computing device with a processor to execute instructions in a machine-readable storage medium for detecting multiple radios within a common sensing area, identifying a first scan time of the multiple radios, determining a second scan time for coordination of the multiple radios to prevent the multiple radios from simultaneously scanning a same channel.

FIG. 5 is a block diagram of computing device 500 with a processor 502 to execute instructions 506-520 within a machine-readable storage medium 504. Specifically, the computing device 500 with the processor 502 is to detect multiple radios within a common sensing area for coordination of the multiple radios to prevent the multiple radios from simultaneously scanning a same channel. Although the computing device 500 includes processor 502 and machine-readable storage medium 504, it may also include other components that would be suitable to one skilled in the art. For example, the computing device 500 may include the controller 104 as in FIG. 1. The computing device 500 is an electronic device with the processor 502 capable of executing instructions 506-520, and as such embodiments of the computing device 500 include a computing device, mobile device, client device, personal computer, desktop computer, laptop, tablet, video game console, or other type of electronic device capable of executing instructions 506-520. The instructions 506-520 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processor 502 may fetch, decode, and execute instructions 506-520 to detect multiple radios within a common sensing area for coordinating the multiple radios to prevent the multiple radios from simultaneously scanning the same channel. In one implementation, once executing instructions 506-508, the processor 502 may execute instruction 510 by either executing instruction 512 or instruction 514. In another implementation, once executing instructions 506-510, the processor 502 may execute instructions 516-520. Specifically, the processor 502 executes instructions 506-508 to: detect multiple radios within the common sensing area; and identifying a first scan time among the multiple radios. The processor 502 may then execute instruction 510 to determine the second scan time based on the first scan time. Instruction 510 may be performed by executing either instruction 512 to decrease an average unscanned time interval or instruction 514 to increase an average of service availability time of the multiple radios. The processor 502 may then execute instructions 516-520 to prevent multiple radios from simultaneously scanning the same channel by providing the second scan time to each of the multiple radios for coordination.

The machine-readable storage medium 504 includes instructions 506-520 for the processor 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

In summary, examples disclosed herein coordinate multiple radios to prevent the multiple radios for simultaneously scanning the same channel.

We claim:

1. A non-transitory machine-readable storage medium comprising instructions that when executed by a processor cause the processor to:
    identify a first scan time associated with multiple radios;
    determine a second scan time based on the first scan time; and
    prevent the multiple radios from simultaneously scanning a same channel through a coordination of channel scanning of each of the multiple radios based on the second scan time.

2. The non-transitory machine-readable storage medium including the instructions of claim 1, further comprising instructions that when executed by the processor cause the processor to:
    detect the multiple radios within a common sensing area.

3. The non-transitory machine-readable storage medium including the instructions of claim 1, wherein the coordination of the channel scanning of each of the multiple radios based on the second scan time is further comprising instructions that when executed by the processor cause the processor to:
    provide the second scan time to each of the multiple radios to coordinate when each of the multiple radios are to scan the same channel.

4. The non-transitory machine-readable storage medium including the instructions of claim 1, wherein to determine the second scan time based on the first scan time is further comprising instructions that when executed by the processor cause the processor to:
    decrease an average non-scanning time of the multiple radios.

5. The non-transitory machine-readable storage medium including the instructions of claim 1, wherein to determine the second scan time based on the first scan time is further comprising instructions that when executed by the processor cause the processor to:
    increase an average time of service availability of the multiple radios for determination of the second scan time.

6. The non-transitory machine-readable storage medium including the instructions of claim 1, wherein the coordination of the channel scanning of each of the multiple radios based on the second scan time is further comprising instructions that when executed by the processor cause the processor to:
    offset scan initialization of each of the multiple radios.

7. A networking system comprising:
    a controller to:
        detect multiple radios;
        identify a first scan time associated with the multiple radios; and
        obtain a second scan time based on the first scan time; and
    multiple radios to coordinate channel scanning based on the determined second scan time, wherein the coordination prevents the multiple radios from simultaneously scanning a same channel.

8. The networking system of claim 7 wherein the controller is further to offset scan initialization of each of the multiple radios.

9. The networking system of claim 7 wherein the controller is further to either increase an average time of service availability of the multiple radios or decrease an average of non-scanning time of the multiple radios to obtain the second scan time.

10. A method, executed by a networking device, the method comprising:
    identifying a first scan time associated with multiple radios;
    determining a second scan time based on the first scan time; and
    coordinating channel scanning of the multiple radios based on the second scan time, thereby preventing the multiple radios from simultaneously scanning a same channel.

11. The method of claim 10 wherein coordinating channel scanning of the multiple radios based on the second channel scan time further comprises:
    providing the second scan time to each of the multiple radios to coordinate when each of the multiple radios are to scan the same channel.

12. The method of claim 10 further comprising:
    detecting the multiple radios within a common sensing area.

13. The method of claim 10 wherein determining the second channel scan time further comprises:
    decreasing an average non-scanning time of the multiple radios to obtain the second scan time; and
    maintaining a service availability time interval between consecutive scans for each of the multiple radios.

14. The method of claim 10 wherein determining the second channel scan time further comprises:
    increasing an average service time availability of the multiple radios to obtain the second scan time; and
    maintaining a non-scanning time interval among the multiple radios.

15. The method of claim 10 wherein the multiple radios scan channels within a same frequency band.

* * * * *